Figure 1:
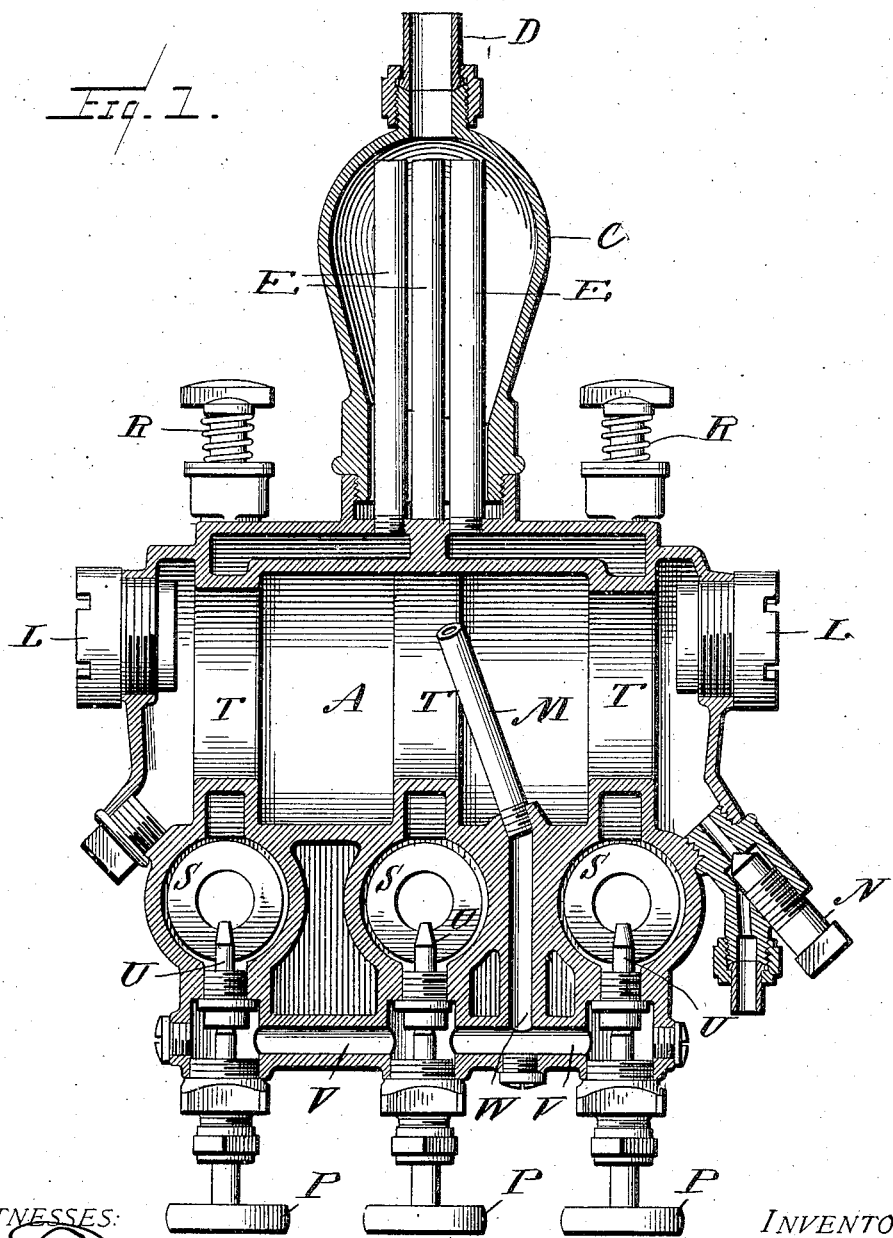

No. 844,281. PATENTED FEB. 12, 1907.
L. KACZANDER.
LUBRICATOR.
APPLICATION FILED MAR. 24, 1904.

2 SHEETS—SHEET 1.

WITNESSES:

INVENTOR

No. 844,281. PATENTED FEB. 12, 1907.
L. KACZANDER.
LUBRICATOR.
APPLICATION FILED MAR. 24, 1904.
2 SHEETS—SHEET 2.
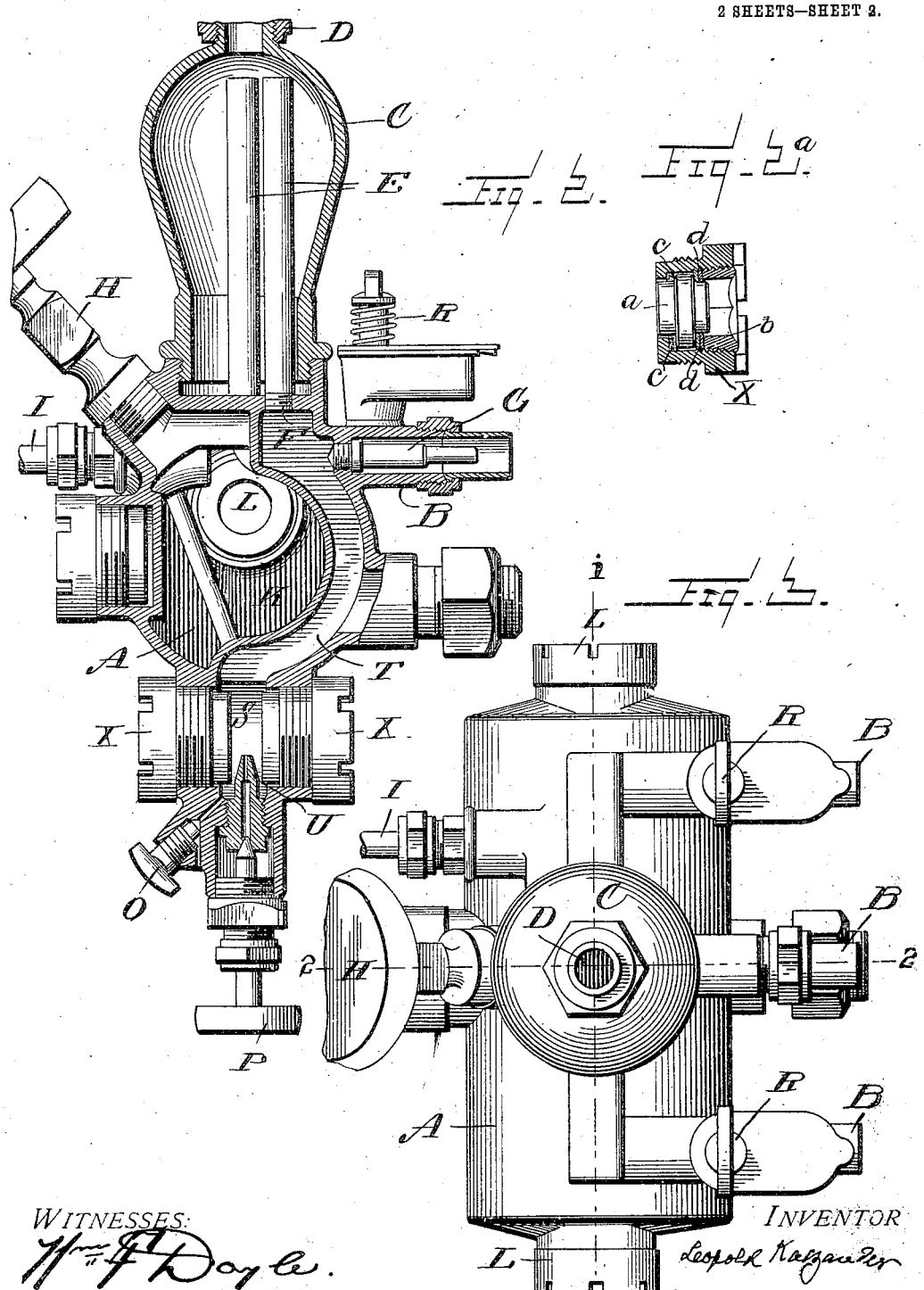

UNITED STATES PATENT OFFICE.

LEOPOLD KACZANDER, OF NEW YORK, N. Y., ASSIGNOR TO NATHAN MANUFACTURING COMPANY, OF NEW YORK, N. Y., A CORPORATION OF NEW YORK.

LUBRICATOR.

No. 844,281.  Specification of Letters Patent.  Patented Feb. 12, 1907.

Application filed March 24, 1904. Serial No. 199,779.

*To all whom it may concern:*

Be it known that I, LEOPOLD KACZANDER, a citizen of the United States, residing in the city, county, and State of New York, have invented certain new and useful Improvements in Lubricators, of which the following is a specification, reference being had to the accompanying drawings, forming part thereof.

The invention relates more particularly to that class of lubricators used in connection with locomotives and in which the oil rises from a suitable reservoir in visible drops through a body of water into the tallow-pipes and thence to the parts to be lubricated. In this class of lubricators, as is well known to those skilled in the art, the water-filled chambers, through which the oil rises in drops, consist of tubular glasses of suitable length and diameter, which glasses are subjected to internal pressure equal to the pressure of the steam in the boiler of the locomotive, and they are also subjected to the effect of expansion and contraction incidental to the heating of the lubricator-body to a high degree of temperature, resulting from the continuous flow of high-tension steam through certain parts of the lubricator and from the subsequent cooling off when the steam is shut off after the completion of service, as at the end of a running period of the locomotive. The glasses are also subjected to sudden chilling from cold drafts through the cab of the locomotive in severe cold weather. It has been found that the very high steam-pressure now prevalent in locomotive service aggravates the injurious effect of these influences upon the glasses and that the latter frequently burst, often causing bodily harm to the enginemen and resulting in delays to trains and in other inconveniences and annoyances. For these reasons it is found desirable to change the glass from the usual tubular form to what is known in the art as the "disk" or "bull's-eye" glass, which can be made thick enough to resist the effect of the highest pressure now used in connection with locomotives without breaking. With this form of glasses it is desirable to locate them in a row on the same horizontal center line in place of distributing them around the exterior of a vertical cylindrical oil-reservoir and to so locate them that the two glasses which form the opposite ends of what is termed the "sight-chamber" may be brought as near to each other as possible independently of the size of the oil-reservoir. It is also desirable to retain the cylindrical form of the oil-reservoir, which form is self-sustaining under high pressure and does not require artificial bracing to withstand the effects of high pressure. These desirable results for their attainment necessitate certain details of construction and relative location and combination of parts which form the subject of my invention and which increase the effectiveness of this class of lubricators, while greatly simplifying them and reducing the cost of manufacture and maintenance.

In the accompanying drawings, Figure 1 is a longitudinal section on line 1 1 of Fig. 3; Fig. 2, a cross-section on line 2 2 of Fig. 3. Fig. 2ᵃ is an axial section of one of the screw-casings X, Fig. 2, detached, showing the disk glass in elevation therein. Fig. 3 is a top view of the lubricator embodying my improvements.

Similar letters of reference indicate similar parts in all the figures.

A is the cylindrical oil-reservoir, placed horizontally and provided with threaded necks B for connecting the oil-pipes which lead to the parts to be lubricated. In this instance there are three such connections leading, respectively, to the two cylinders and to the air-brake cylinder of the locomotive. C is the condenser, with the usual connection D for attaching the steam-supply pipe from the boiler. E are the equalizing-pipes, and F the equalizing steam-passages which lead steam behind the "choke-plugs" G, seated in the outlet-passages in the well-known manner. H is the filler-plug; I, the water-valve controlling the passage of condensed water from the condenser to the bottom of the reservoir through tube K. L L are gage-glasses to indicate the contents of the oil-reservoir. M is the oil-tube. N is the waste or drain valve; O, blow-off valves for blowing out the sight-chambers when necessary, and P the feed-regulating valves. R R are hand-oilers. The function and operation of all these parts, singly and in combination, are too well known to require any further description.

Below the oil-reservoir, outside of its external periphery, but integral with the same, I cast cross-chambers S at right angles to the horizontal axis of the reservoir. These chambers communicate with the outlets B by means of channels T, cast in the reservoir. The lower sides of the chambers S contain the usual feed-nozzles U, through which the oil passes as permitted by the regulating-valves P. To lead the oil from the top of the reservoir through pipe M into the spaces below the feed-nozzles, I connect those portions of the several chambers S with one another by means of a cross-channel V, into which opens a vertical channel W, formed in the same casting with the sight-chambers and connected at its upper end with tube M. In front and back of each chamber S, I screw casings X, which contain the disk glasses. (Not shown in section.) By looking through from X to X the drops of oil may be seen ascending through the water-filled space between the glasses.

In Fig. 2ª one of the casings X is shown detached in axial section. X is the casing. $a$ is the disk glass. $b$ is the follower; $c$, the packing, and $d$ the washers, by the conjoint action of which the disk glass is tightly held in the casing. Any other suitable means for mounting the glass in the casing can of course be employed.

It will be readily observed that by placing the sight-chambers S below the reservoir and entirely independent of its size, width, or diameter I am able to place the glasses as near together as is required for clear and proper sight without interfering with the desirable cylindrical form of the reservoir or filling up its interior with the chambers for holding the glass casings, which reduce the capacity of the cylinder and necessitate a larger reservoir than is required with my construction. I am also enabled thereby to reduce the weight of the apparatus, making it more economical and easier to manufacture.

I am aware that it is not new to employ disk glasses in connection with sight-feed lubricators and to place two or more of them in a row or to cast the sight-chambers integral with the reservoir; but What I consider new and useful herein, and desire to secure by Letters Patent, is—

1. In a sight-feed lubricator the combination with the oil-reservoir and the steam, equalizing and oil-pipe connections, of sight-chambers cast integral with the oil-reservoir and located below and outside of the oil-reservoir, as and for the purpose specified.

2. In a sight-feed lubricator the combination of the oil-reservoir, the steam, equalizing and oil-pipe connections and sight-chambers cast integral with the oil-reservoir, there being a horizontal oil-channel communicating with the oil-reservoir and connecting the sight-chambers with one another, said oil-channel as well as the sight-chambers being located below and outside of the oil-reservoir, substantially as specified.

3. In a sight-feed lubricator, the combination of the oil-reservoir, the steam, equalizing and oil-pipe connections and sight-chambers cast integral with the oil-reservoir, there being a horizontal oil-channel, connecting the sight-chambers, and a vertical oil-channel communicating on the one hand with the horizontal channel and on the other hand with the oil-reservoir, both oil-channels cast integral with, and located below and outside of, the oil-reservoir, as and for the purpose specified.

4. In a sight-feed lubricator the combination with the oil-reservoir and steam, equalizing and oil-pipe connections, of a structure cast integral with and located below and externally to the oil-reservoir and containing the sight-chambers and horizontal and vertical oil-passages, as and for the purpose specified.

In testimony whereof I affix my signature in presence of two witnesses.

LEOPOLD KACZANDER.

Witnesses:
ADOLPH BARGEBUHR,
JAMES E. MURPHY.